(12) United States Patent
Sullivan

(10) Patent No.: US 10,368,105 B2
(45) Date of Patent: Jul. 30, 2019

(54) METADATA DESCRIBING NOMINAL LIGHTING CONDITIONS OF A REFERENCE VIEWING ENVIRONMENT FOR VIDEO PLAYBACK

(71) Applicant: Microsoft Technology Licensing, LLC, Redmond, WA (US)

(72) Inventor: Gary J. Sullivan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/146,800

(22) Filed: May 4, 2016

(65) Prior Publication Data

US 2016/0366444 A1 Dec. 15, 2016

Related U.S. Application Data

(60) Provisional application No. 62/173,351, filed on Jun. 9, 2015.

(51) Int. Cl.
*H04N 19/70* (2014.01)
*H04N 21/84* (2011.01)
(Continued)

(52) U.S. Cl.
CPC .......... *H04N 19/70* (2014.11); *H04N 19/134* (2014.11); *H04N 19/162* (2014.11);
(Continued)

(58) Field of Classification Search
None
See application file for complete search history.

(56) References Cited

U.S. PATENT DOCUMENTS 7,369,903 B2 5/2008 Diederiks et al.
8,704,859 B2 4/2014 Greenebaum et al.
(Continued)

FOREIGN PATENT DOCUMENTS

EP 2018062 1/2009
WO WO 94/18787 8/1994
(Continued)

OTHER PUBLICATIONS

CIE Technical Report, "Colorimetry," CIE 15, $3^{rd}$ Edition, 82 pp. (2004).
(Continued)

*Primary Examiner* — Heather R Jones
(74) *Attorney, Agent, or Firm* — Klarquist Sparkman, LLP

(57) ABSTRACT

Innovations in the areas of generating, parsing, and using metadata that describes nominal lighting conditions of a reference viewing environment for video playback are presented herein. In various examples described herein, metadata includes parameters that describe the nominal lighting conditions (e.g., level of ambient light, color characteristics of ambient light) of a reference viewing environment. By conveying a representation of the nominal lighting conditions of the reference viewing environment (e.g., one assumed when mastering image content), a transmitter system can enable a receiver system to adapt its local display of the image content. Upon receiving image content and the metadata, the receiver system can identify characteristics of the actual viewing environment, use the metadata to determine whether the actual viewing environment matches the reference viewing environment, and, if not, adjust sample values of the image content, adjust a display device, or adjust lighting conditions of the actual viewing environment.

24 Claims, 5 Drawing Sheets

(51) Int. Cl.
| | |
|---|---|
| H04N 21/235 | (2011.01) |
| H04N 21/435 | (2011.01) |
| H04N 19/46 | (2014.01) |
| H04N 19/134 | (2014.01) |
| H04N 19/186 | (2014.01) |
| H04N 19/162 | (2014.01) |
| H04N 19/85 | (2014.01) |

(52) U.S. Cl.
CPC ............ *H04N 19/186* (2014.11); *H04N 19/46* (2014.11); *H04N 19/85* (2014.11); *H04N 21/2353* (2013.01); *H04N 21/435* (2013.01); *H04N 21/84* (2013.01)

(56) References Cited

U.S. PATENT DOCUMENTS

| | | | |
|---|---|---|---|
| 8,743,101 | B2 | 6/2014 | Kaji et al. |
| 8,847,972 | B2 | 9/2014 | Kane et al. |
| 8,885,109 | B2 | 11/2014 | Yoon et al. |
| 8,891,934 | B2 | 11/2014 | Messmer |
| 8,928,811 | B2 | 1/2015 | Li et al. |
| 2009/0109340 | A1* | 4/2009 | Iwanami ............... H04N 21/235 348/602 |
| 2010/0177247 | A1 | 7/2010 | Sekulovski et al. |
| 2012/0182276 | A1 | 7/2012 | Kee |
| 2013/0120656 | A1 | 5/2013 | Wilson et al. |
| 2013/0170540 | A1 | 7/2013 | Damkat et al. |
| 2014/0078165 | A1 | 3/2014 | Messmer et al. |
| 2014/0168277 | A1 | 6/2014 | Ashley et al. |
| 2014/0292792 | A1 | 10/2014 | Chen et al. |
| 2014/0375669 | A1 | 12/2014 | Zhang et al. |
| 2017/0238062 | A1* | 8/2017 | Oh ........................ H04N 7/015 725/116 |

FOREIGN PATENT DOCUMENTS

| | | |
|---|---|---|
| WO | WO 2014-078748 | 5/2014 |
| WO | WO 2014-130213 | 8/2014 |
| WO | WO 2016/080754 | 5/2016 |

OTHER PUBLICATIONS

Doom9's Forum, "How VP9 works, technical details & diagrams," downloaded from the World Wide Web, 15 pp. (Oct. 2013).
Grange et al., "A VP9 Bitstream Overview," downloaded from the World Wide Web, 14 pp. (Feb. 2013).
ISO/IEC 14496-2, "Information Technology—Coding of Audio-Visual Objects: Visual," 327 pp. (Mar. 1998).
ITU-R Recommendation BT.500-13, "Methodology for the subjective assessment of the quality of television pictures," 46 pp. (Jan. 2012).
ITU-R Recommendation BT.601-7, "Studio encoding parameters of digital television for standard 4:3 and wide-screen 16:9 aspect ratios," 19 pp. (Mar. 2011).
ITU-R Recommendation BT.709-5, "Parameter values for the HDTV standards for production and international programme exchange," 32 pp. (Apr. 2002).
ITU-R Recommendation BT.710-4, "Subjective Assessment Methods for Image Quality in High-Definition Television," 2 pp. (Nov. 1998).
ITU-R Recommendation BT.814-2, "Specifications and alignment procedures for setting of brightness and contrast of displays," 7 pp. (Sep. 2007).
ITU-R Recommendation BT.1129-2, "Subjective Assessment of Standard Definition Digital Television (SDTV) Systems," 11 pp. (Feb. 1998).
ITU-R Recommendation BT.1886, "Reference electro-optical transfer function for flat panel displays used in HDTV studio production," 7 pp. (Mar. 2011).
ITU-R Recommendation BT.2020, "Parameter values for ultra-high definition television systems for production and international programme exchange," 7 pp. (Aug. 2012).
ITU-R Recommendation BT.2022, "General viewing conditions for subjective assessment of quality of SDTV and HDTV television pictures on flat panel displays," 7 pp. (Aug. 2012).
ITU-R Recommendation BT.2035, "A reference viewing environment for evaluation of HDTV program material for completed programmes," 9 pp. (Jul. 2013).
ITU-R Recommendation BT.2390-0, "High dynamic range television for production and international programme exchange," 40 pp. (Feb. 2016).
ITU-T Recommendation H.262, "Information Technology—Generic Coding of Moving Pictures and Associated Audio Information: Video," 218 pp. (Jul. 1995).
ITU-T Recommendation H.264, "Advanced video coding for generic audiovisual services," 680 pp. (Jan. 2012).
ITU-T Recommendation H.265: High efficiency video coding, 634 pp. (Apr. 2015).
Sullivan, "Ambient viewing environment SEI message," JCTVC-U0112, 4 pp. (Jun. 2015).
Wikipedia, "CIE 1931 color space," downloaded from the World Wide Web, 11 pp. (document marked: last modified Feb. 22, 2016).
Zabel et al,. "Prototyping an Ambient Light System—A Case Study," *Int'l Federation for Information Processing, From Model-Driven Design to Resource Management for Distributed Embedded Systems*, vol. 225, pp. 55-64 (Oct. 2006).
Fogg et al., "Indication of SMPTE 2084 and 2085 and carraige of 2086 metadata in HEVC," JCTVC-P0084, 5 pp. (Jan. 2014).
International Search Report and Written Opinion dated Jul. 21, 2016, from International Patent Application No. PCT/US2016/031884, 15 pp.
Joshi et al., "High Efficiency Video Coding (HEVC) Screen Content Coding: Draft 3," JCTVC-T1005, v2, 563 pp. (Feb. 2015).
International Preliminary Report on Patentability dated Jun. 20, 2017, from International Patent Application No. PCT/US2016/031884, 11 pp.
Written Opinion of the International Preliminary Examining Authority dated Mar. 21, 2017, from International Patent Application No. PCT/US2016/031884, 6 pp.
Communication pursuant to Rules 161(1) and 162 EPC dated Jan. 16, 2018, from European Patent Application No. 16726696.4, 3 pp.
U.S. Appl. No. 62/081,590, filed Nov. 19, 2014, 25 pp.
Joshi et al., "High Efficiency Video Coding (HEVC) Screen Content Coding: Draft 4," JCTVC-U1005-v2, 661 pp. (Sep. 2015).
Sullivan et al., "Meeting Report of the 21st Meeting of the Joint Collaborative Team on Video Coding (JCT-VC), Warsaw, PL, Jun. 19-26, 2015," JCTVC-U_Notes_dC, 114 pp. (Oct. 2015).

\* cited by examiner software 180 implementing one or more innovations for generation, parsing, and/or use of metadata describing nominal lighting condition(s) of a reference viewing environment for video playback

| ambient_viewing_environment( payloadSize ) { | Descriptor |
|---|---|
| ambient_illuminance | u(32) |
| ambient_light_x | u(16) |
| ambient_light_y | u(16) |
| } | |

METADATA DESCRIBING NOMINAL LIGHTING CONDITIONS OF A REFERENCE VIEWING ENVIRONMENT FOR VIDEO PLAYBACK

RELATED APPLICATION INFORMATION

This application claims the benefit of U.S. Provisional Patent Application No. 62/173,351, filed Jun. 9, 2015, the disclosure of which is hereby incorporated by reference.

BACKGROUND

When image content such as video is sent through a communication system, the image content is typically digitized into sample values, which are compressed before transmission and decompressed after receipt. Various factors affect how the sample values are interpreted, displayed, and perceived.

A convention defined in a standard, proprietary format or industry practice, or other implicit understanding, may indicate how sample values should be interpreted or displayed when they are received. Alternatively, metadata may be explicitly signaled that indicates how sample values should be interpreted or displayed. In particular, encoded data for an image or video can include information that identifies (by enumeration or other means) how sample values should be interpreted or displayed. For example, the metadata can be parameters such as color primary chromaticity values, transfer characteristics (informally known as gamma), and matrix coefficients. Such metadata typically relates to the characteristics of source (original) sample values or characteristics of a reference, or "master," display device used when editing sample values during a production process, so as to optimize presentation on display devices like the reference display device. Display of image content, however, depends on more than the characteristics of source content and characteristics of a display device.

SUMMARY

The environment in which image content is viewed by a viewer, in particular the ambient light characteristics of the environment, can have a substantial effect on perceptual quality. Aside from the overall level of ambient light, the color temperature of light can differ depending on the viewing environment. Viewing image content in a darkened theater is substantially different than viewing it in a home or brightly-lit public space, which is substantially different than viewing it outdoors. Even in a home environment, the viewing experience may be substantially different in daytime when daylight is coming through windows, versus nighttime. Further, the amount (and characteristics) of light in a room can differ substantially depending on which lights in the room are turned on or off. Thus, in actual viewing environments, actual lighting conditions may differ substantially from the nominal lighting conditions established by a standard or industry convention, or defined in metadata based on the image content or a reference display device, or defined for a hypothetical viewing environment.

In summary, the detailed description presents innovations in the areas of generating, parsing, and using metadata that describes nominal lighting conditions of a reference viewing environment for video playback. In various examples described herein, a supplemental enhancement information ("SEI") message or other metadata includes parameters that describe the nominal lighting conditions (e.g., level of ambient light, color characteristics of ambient light) of a reference viewing environment. The metadata can describe a reference viewing environment in place (e.g., implicitly assumed, explicitly chosen, designed-in, or intended) when mastering image content. By conveying a representation of the nominal lighting conditions of a reference viewing environment that was in place when mastering image content, a transmitter system can enable a receiver system to adapt its local display of the image content. Upon receiving image content and the metadata, the receiver system can identify characteristics of the actual viewing environment (e.g., by measuring the level of ambient light in the actual viewing environment, and/or by applying a preset setting selected by the user or set according to the type of actual viewing environment). The receiver system can use the metadata to determine whether the actual viewing environment matches the reference viewing environment. If not, the receiver system can adjust sample values (e.g., adjusting intensity and/or color characteristics) to compensate for differences, if any, between the nominal lighting conditions and actual lighting conditions. Thus, the receiver system can adjust the image content rendered by the actual display device to enable a viewing experience that is adapted appropriately for the actual viewing environment. Or, the receiver system can adjust the actual display device or actual lighting conditions, so as to compensate for differences, if any, between the nominal lighting conditions and the actual lighting conditions.

According to a first set of innovations described herein, metadata is generated that describes one or more nominal lighting conditions of a reference viewing environment for playback of video. For example, the metadata includes one or more parameters that specify a nominal level of ambient light in the reference viewing environment and/or one or more parameters that specify a nominal color characteristic of the ambient light in the reference viewing environment. The parameter(s) that specify the nominal level of ambient light can include an indicator of light per unit of area. The parameter(s) that specify the nominal color characteristic of ambient light can include coordinates in a multi-dimensional mapping of values in a color space. The metadata is stored for output with encoded data for the video.

According to a second set of innovations described herein, metadata is received and parsed that describes one or more nominal lighting conditions of a reference viewing environment for playback of video. The metadata includes one or more parameters that specify a nominal level of ambient light in the reference viewing environment and/or one or more parameters that specify a nominal color characteristic of the ambient light in the reference viewing environment. The parameter(s) that specify the nominal level of ambient light can include an indicator of light per unit of area. The parameter(s) that specify the nominal color characteristic of ambient light can include coordinates in a multi-dimensional mapping of values in a color space.

The innovations can be implemented as part of a method, as part of a computing system configured to perform the method or as part of a tangible computer-readable media storing computer-executable instructions for causing a computing system to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 8 is a table illustrating an example syntax structure for a supplemental enhancement information ("SEI") message that includes metadata defining nominal lighting conditions of a reference viewing environment for video playback.

DETAILED DESCRIPTION

The detailed description presents innovations in generating, parsing, and using metadata that describes nominal lighting conditions of a reference viewing environment for video playback.

Some of the innovations described herein are illustrated with reference to terms specific to the H.265/HEVC standard and extensions of the H.265/HEVC standard. The innovations described herein can also be implemented for other video codec standards or formats (e.g., the VP9 format, H.264/AVC standard). Or, the innovations described herein can be implemented for an image codec standard or format (e.g., the JPEG standard, JPEG 2000 standard, JPEG XR standard, WebP format, GIF format).

In the examples described herein, identical reference numbers in different figures indicate an identical component, module, or operation. Depending on context, a given component or module may accept a different type of information as input and/or produce a different type of information as output.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

Figure 1:
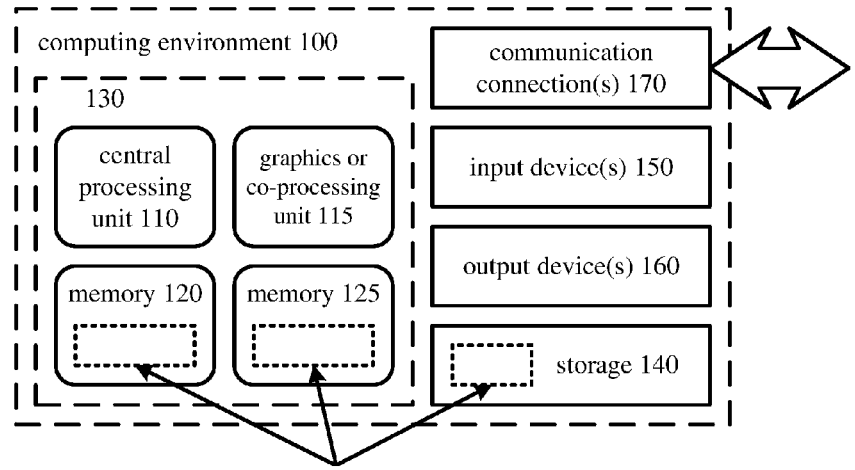
FIG. 1 is a diagram illustrating an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for generation, parsing, and/or use of metadata that describes one or more nominal lighting conditions of a reference viewing environment for video playback, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, optical media such as CD-ROMs or DVDs, or any other medium which can be used to store information and which can be accessed within the computing system (100). The storage (140) stores instructions for the software (180) implementing one or more innovations for generation, parsing, and/or use metadata that describes one or more nominal lighting conditions of a reference viewing environment for video playback.

The input device(s) (150) may be a touch input device such as a keyboard, mouse, pen, or trackball, a voice input device, a scanning device, or another device that provides input to the computing system (100). For video, the input device(s) (150) may be a camera, video card, screen capture module, TV tuner card, or similar device that accepts video input in analog or digital form, or a CD-ROM or CD-RW that reads video input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations thereof. As used herein, the term computer-readable media does not include transitory signals or propagating carrier waves.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a graphics processing unit ("GPU"), or a programmable logic device ("PLD") such as a field programmable gate array ("FPGA")) specially designed or configured to implement any of the disclosed methods.

For the sake of presentation, the detailed description uses terms like "determine" and "evaluate" to describe computer operations in a computing system. These terms are high-level abstractions for operations performed by a computer, and should not be confused with acts performed by a human being. The actual computer operations corresponding to these terms vary depending on implementation.

II. Example Network Environments.

Figure 2A:
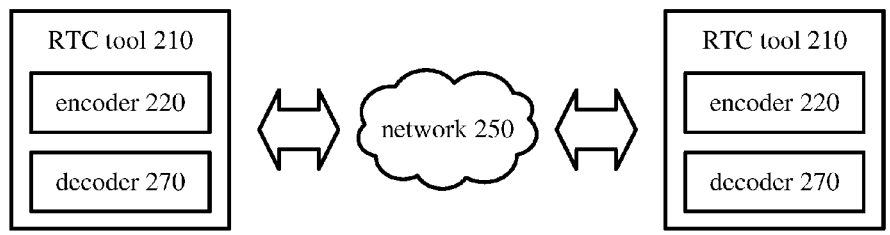
FIGS. 2a and 2b are diagrams illustrating example network environments in which some described embodiments can be implemented.
Figure 2B:
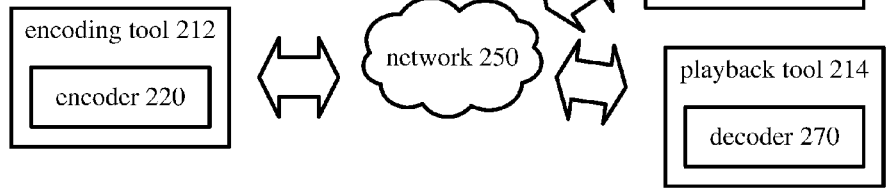

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the H.265/HEVC standard, SMPTE 421M standard, ISO/IEC 14496-10 standard (also known as H.264/AVC), another standard, or a proprietary format such as VP8 or VP9, with a corresponding decoder (270) accepting encoded data from the encoder (220). The bidirectional communication can be part of a video conference, video telephone call, or other two-party or multi-party communication scenario. Although the network environment (201) in FIG. 2a includes two real-time communication tools (210), the network environment (201) can instead include three or more real-time communication tools (210) that participate in multi-party communication.

A real-time communication tool (210) manages encoding by an encoder (220). A real-time communication tool (210) also manages decoding by a decoder (270).

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or sharing, wireless screen casting, cloud computing or gaming, or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

The encoding tool (212) can also include server-side controller logic for managing connections with one or more playback tools (214). A playback tool (214) can include client-side controller logic for managing connections with the encoding tool (212).

III. Example Transmitter Systems and Example Receiver Systems.

Figure 3:
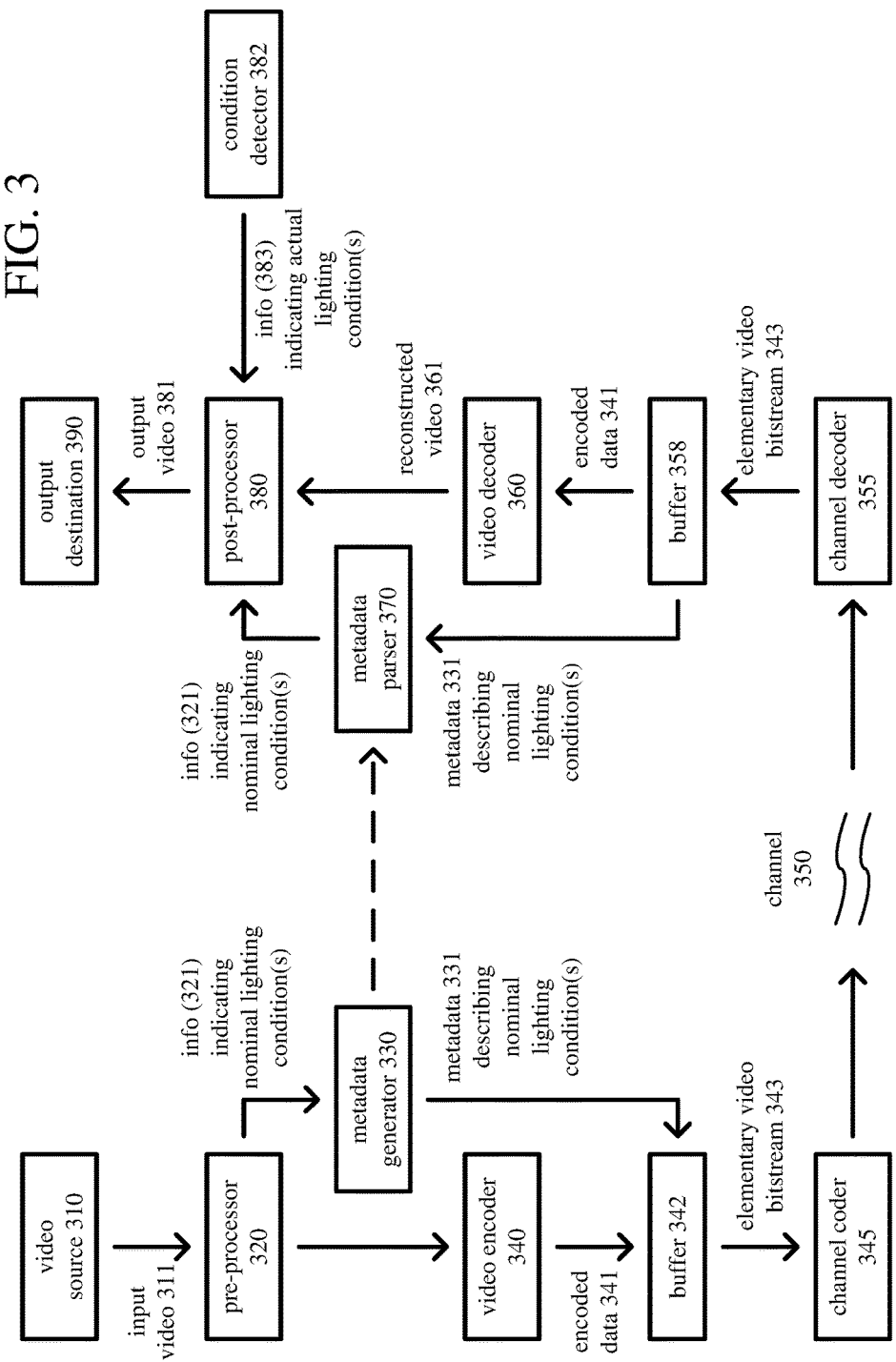
FIG. 3 is a diagram illustrating an example transmitter system and example receiver system in conjunction with which some described embodiments can be implemented.

FIG. 3 shows an example transmitter system and example receiver system in conjunction with which some described embodiments may be implemented.

A. Example Transmitter Systems.

With reference to FIG. 3, the example transmitter system is configured to receive a sequence of source video pictures as input video (311) from a video source (310) and produce encoded data (341) in a channel-coded elementary video bitstream (343) as output. In FIG. 3, the example transmitter system includes a video source (310), a pre-processor (320), a metadata generator (330), a video encoder (340), a buffer (342), and a channel coder (345). Different components of the example transmitter system can be implemented as part of an operating system module, as part of an application library, as part of a standalone application, or using special-purpose hardware.

The video source (310) can be a camera, tuner card, storage media, screen capture module, or other digital video source. The video source (310) is configured to produce a sequence of video pictures at a frame rate of, for example, 30 frames per second, for the input video (311). As used herein, the term "picture" generally refers to source, coded or reconstructed image data. For progressive-scan video, a picture is a progressive-scan video frame. For interlaced video, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source picture for the input video (311) is stored in a source picture temporary memory storage area that includes multiple picture buffer storage areas, which are configured to receive the input video (311). A picture buffer holds one source picture in the source picture storage area. After one or more of the source pictures have been stored in picture buffers, a picture selector selects an individual source picture from the source picture storage area to encode as the current picture. The order in which pictures are selected by the picture selector for input to the video encoder (340) may differ from the order in which the pictures are produced by the video source (310), e.g., the encoding of some pictures may be delayed in order, so as to allow some later pictures to be encoded first and to thus facilitate temporally backward prediction.

The pre-processor (320) is configured to perform pre-processing of the current picture before encoding. The pre-processing can include color space conversion into primary (e.g., luma) and secondary (e.g., chroma differences toward red and toward blue) components as well as resampling processing (e.g., to reduce the spatial resolution of chroma components) for encoding. Thus, before encoding, video may be converted to a color space such as YUV, in which sample values of a luma (Y) component represent brightness or intensity values, and sample values of chroma (U, V) components represent color-difference values. The precise definitions of the color-difference values (and conversion operations to/from YUV color space to another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. The chroma sample values may be sub-sampled to a lower chroma sampling rate (e.g., for a YUV 4:2:0 format or YUV 4:2:2 format), or the chroma sample values may have the same resolution as the luma sample values (e.g., for a YUV 4:4:4 format). Alternatively, video can be organized according to another format (e.g., RGB 4:4:4 format, GBR 4:4:4 format or BGR 4:4:4 format). In general, a pixel is the set of one or more collocated sample values for a location in a picture, which may be arranged in different ways for different chroma sampling formats.

The pre-processor (320) is also configured to selectively adjust at least some characteristics of the input video (311) based on (a) characteristics of a reference display device, and/or (b) the nominal lighting condition(s) of a reference viewing environment. The pre-processor (320) includes one or more tools that allow an editor to "master" or otherwise adjust sample values of the input video (311). For example, the pre-processor (320) includes a tool that allows an editor to adjust the sample values of the input video (311) so that the sample values appear as desired when rendered on a reference display device. To the metadata generator (330), the pre-processor (320) can output information indicating the characteristics of the reference display device. The pre-processor (320) also includes a tool that allows an editor to adjust the sample values of the input video (311) so that the sample values appear as desired when rendered in a reference viewing environment. To the metadata generator (330), the pre-processor (320) can output information indicating the characteristics of the reference viewing environment, including information (321) indicating one or more nominal lighting conditions of the reference viewing environment. The information (321) indicating nominal lighting condition(s) can include a nominal level of ambient light and/or a nominal color characteristic (e.g., color temperature, chromaticity value or coordinates). Or, the information (321) indicating nominal lighting condition(s) can include adjustments (if any) that may be performed to reach a final lighting state (characterized by a nominal level of ambient light and/or a nominal color characteristic), starting from the initial lighting state of a hypothetical viewing environment.

The metadata generator (330) is configured to generate metadata (331) that describes the nominal lighting condition(s), as described above. Examples of metadata (331) that describes nominal lighting condition(s) are presented below. The metadata generator (330) can also be configured to generate other types of metadata, e.g., metadata defining reference display characteristics. A buffer (not shown) can be configured to temporarily store metadata output by the metadata generator (330).

The video encoder (340) is configured to encode pictures of the pre-processed video to produce coded pictures in the encoded data (341). Generally, the video encoder (340) includes multiple encoding modules that perform encoding tasks such as partitioning into tiles, intra-picture prediction estimation and prediction, motion estimation and compensation, frequency transforms, quantization, and entropy coding. The exact operations performed by the video encoder (340) can vary depending on compression format and can also vary depending on encoder-optional implementation decisions.

As shown in FIG. 3, the encoded data (341) and metadata (331) are buffered in a temporary coded data area, shown as a buffer (342) configured to store the encoded data (341) and store the metadata (331) for output with encoded data (341). The metadata (331) describing nominal lighting condition(s) can be organized as one or more parameters in one or more supplemental enhancement information ("SEI") messages, video usability information ("VUI") messages, or another type of syntax structure. Examples of SEI messages are presented below. The buffer (342) produces an elementary video bitstream (343) that includes the encoded data (341) and metadata (331) describing nominal lighting condition(s). The format of the elementary video bitstream (343) can be a variation or extension of Windows Media Video format, VC-1 format, MPEG-x format (e.g., MPEG-1, MPEG-2, or MPEG-4), H.26x format (e.g., H.261, H.262, H.263, H.264, H.265), or VPx format, or another format. After output from the video encoder (340), the elementary video bitstream (343) is typically packetized or organized in a container format.

The channel coder (345) is configured to process data in the elementary video bitstream (343). The channel encoder (345) can packetize and/or multiplex the aggregated data for transmission or storage as a media stream, in which case the channel encoder (345) can add syntax elements as part of the syntax of the media transmission stream. Or, the channel encoder (345) can organize the aggregated data for storage as a file, in which case the channel encoder (345) can add syntax elements as part of the syntax of the media storage file. Or, more generally, the channel encoder (345) can implement one or more media system multiplexing protocols or transport protocols, in which case the channel encoder (345) can add syntax elements as part of the syntax of the protocol(s). The metadata (331) describing nominal lighting condition(s) can be added as syntax elements as part of the syntax of a media streaming protocol, media storage protocol, multiplexing protocol, transport protocol, etc. (e.g., when not included in the elementary video bitstream (343)). (In this case, the metadata generator (330) can provide the metadata (331) directly to the channel coder (345).) The channel encoder (345) provides output to a channel (350), which represents storage, a communications connection, or another channel for the output. The channel encoder (345) or channel (350) may also include other elements (not shown), e.g., for forward-error correction ("FEC") encoding and analog signal modulation.

Depending on implementation, modules of the example transmitter system can be added, omitted, split into multiple modules, combined with other modules, and/or replaced with like modules. In alternative embodiments, transmitter systems with different modules and/or other configurations of modules perform one or more of the described innovations. The relationships shown between modules within the example transmitter system indicate general flows of information; other relationships are not shown for the sake of simplicity.

For example, the example transmitter system can be a video encoding system that includes all of the transmitter-side components shown in FIG. 3. Or, the example transmitter system can be a video transcoding system that includes all of the transmitter-side components shown in FIG. 3 as well as a video decoder. Or, the example transmitter system can be a video mastering system that lacks a video encoder, buffer (for encoded data), and channel coder, instead producing pre-processed video and metadata describing nominal lighting condition(s). Or, the example transmitter system is some other type of transmitter system.

B. Example Receiver Systems.

With reference to FIG. 3, the example receiver system is configured to receive encoded data (341) in a channel-coded elementary video bitstream (343) from the channel (350) and produce pictures of reconstructed video (361), which may be post-processed, as output for an output destination (390). The example receiver system includes a channel decoder (355), a buffer (358), a video decoder (360), a metadata parser (370), a post-processor (380), a condition detector (382), and an output destination (390). Different components of the example receiver system can be implemented as part of an operating system module, as part of an application library, as part of a standalone application or using special-purpose hardware.

In the example receiver system, the channel decoder (355) is configured to process channel-coded data. For example, the channel decoder (355) de-packetizes and/or demultiplexes data that has been organized for transmission or storage as a media stream, in which case the channel decoder (355) can parse syntax elements added as part of the syntax of the media transmission stream. Or, the channel decoder (355) separates coded video data that has been organized for storage as a file, in which case the channel decoder (355) can parse syntax elements added as part of the syntax of the media storage file. Or, more generally, the channel decoder (355) can implement one or more media system demultiplexing protocols or transport protocols, in which case the channel decoder (355) can parse syntax elements added as part of the syntax of the protocol(s). Thus, the channel decoder (355) can parse syntax elements for metadata (331) describing nominal lighting condition(s), if such syntax elements have been added as part of the syntax of a media streaming protocol, media storage protocol, multiplexing protocol, transport protocol, etc. (e.g., when not included in the elementary video bitstream (343)). (In this case, the channel decoder (355) can provide the metadata (331) directly to the metadata parser (370).) The channel (350) or channel decoder (355) may also include other elements (not shown), e.g., for FEC decoding and analog signal demodulation.

As shown in FIG. 3, data in the elementary video bitstream (343) produced by the channel decoder (355) are buffered in a temporary coded data area, shown as a buffer (358) configured to store encoded data (341) and metadata (331) in the elementary video bitstream (343), until a sufficient quantity of such data has been received. Encoded data (341) in the buffer (358) contains, as part of the syntax of an elementary video bitstream (343), coded data for one or more pictures. The elementary video bitstream (343) can also include metadata relating to the encoded video data (e.g., as one or more parameters in one or more SEI messages or VUI messages), such as the metadata (331) describing nominal lighting condition(s) of the reference viewing environment. The metadata (331) describing nominal lighting condition(s) can be organized as one or more parameters in one or more SEI messages, VUI messages, or another type of syntax structure. The format of the elementary video bitstream (343) can be a variation or extension of Windows Media Video format, VC-1 format, MPEG-x format (e.g., MPEG-1, MPEG-2, or MPEG-4), H.26x format (e.g., H.261, H.262, H.263, H.264, H.265), or VPx format, or another format. In general, the buffer (358) temporarily stores encoded data (341) until such encoded data (341) is used by the video decoder (360). At that point, coded data for a coded picture is transferred from the buffer (358) to the video decoder (360). As decoding continues, new coded data is added to the buffer (358), and the oldest coded data remaining in the buffer (358) is transferred to the video decoder (360).

The video decoder (360) is configured to decode a coded picture to produce a corresponding decoded picture. The video decoder (360) receives the coded picture as input as part of the elementary video bitstream (343), and the video decoder (360) produces the corresponding decoded picture as output as reconstructed video (361). Generally, the video decoder (360) includes multiple decoding modules that perform decoding tasks such as entropy decoding, inverse quantization, inverse frequency transforms, motion compensation, intra-picture prediction, and filtering. The exact operations performed by the video decoder (360) can vary depending on the type of information being decompressed.

After the video decoder (360), a decoded picture temporary memory storage area includes multiple picture buffer storage areas, which are configured to store pictures of the reconstructed video (361). The video decoder (360) identifies a picture buffer in which it can store a decoded picture of the reconstructed video (361). The decoder (360) stores the decoded picture in that picture buffer.

A buffer (not shown) can be configured to temporarily store metadata that is input to the metadata parser (370). The metadata parser (370) is configured to parse metadata (331) that describes nominal lighting condition(s) of a reference viewing environment. Examples of metadata (331) that describes nominal lighting condition(s) are presented below. To the post-processor (380), the metadata parser (370) provides information indicating the characteristics of a reference viewing environment, including information (321) indicating nominal lighting condition(s) of the reference viewing environment. The information (321) indicating nominal lighting condition(s) can include a nominal level of ambient light and/or a nominal color characteristic (e.g., color temperature, chromaticity value or coordinates). Or, the information (321) indicating nominal lighting condition(s) can include adjustments (if any) that may be performed to reach a final lighting state (characterized by a nominal level of ambient light and/or a nominal color characteristic), starting from the initial lighting state of a hypothetical viewing environment. For different hypothetical viewing environments, the information (321) can include different adjustments. The metadata generator (370) can also be configured to parse other types of metadata, e.g., metadata defining characteristics of a reference display device, and provide such information to the post-processor (380).

The condition detector (382) is configured to determine one or more actual lighting conditions for an actual viewing environment that includes the example receiver system. For example, the condition detector (382) is, or includes, a sensor configured to detect an actual level of ambient light in the actual viewing environment. Or, the condition detector (382) is, or includes, a module configured to look up a user-defined setting or other tuning parameter in a storage area, where the user-defined setting/tuning parameter indicates an actual color characteristic (e.g., color temperature, chromaticity value or coordinates) of ambient light in the actual viewing environment. The condition detector (382) provides information (383) about the actual lighting condition(s) to the post-processor (380).

The post-processor (380) is configured to perform post-processing of decoded pictures of the reconstructed video (361) after decoding, producing output video (381). The post-processing can include resampling processing (e.g., to restore the spatial resolution of chroma components or to adapt the video content for use on a display with a different spatial resolution) after decoding as well as color space conversion from primary and secondary color components. For example, after decoding, chroma sample values may be re-sampled to a higher chroma sampling rate (e.g., from a YUV 4:2:0 format or YUV 4:2:2 format), and video may be converted from a color space such as YUV to another color space such as RGB, GBR, or BGR.

The post-processor (380) is also configured to adjust, in order to compensate for differences between the actual lighting condition(s) and the nominal lighting condition(s), a characteristic of at least some sample values of the video. In doing so, the post-processor (380) can in effect change the interpretation of the sample values of the reconstructed video (361) or output video (381). The post-processor (380) includes one or more tools that adjust sample values of the output video (381) to compensate for differences between the nominal lighting condition(s) and actual lighting condition(s). For example, the post-processor (380) increases the brightness of at least some sample values when a nominal level of ambient light (for the reference viewing environment) is darker than an actual level of ambient light (for the actual viewing environment). Or, the post-processor (380) decreases the brightness of at least some sample values when a nominal level of ambient light (for the reference viewing environment) is brighter than an actual level of ambient light (for the actual viewing environment). Or, when a nominal color characteristic (for the reference viewing environment) differs from an actual color characteristic (for the actual viewing environment), the post-processor (380) attenuates or scales certain sample values of the video to compensate for the difference. Or, the post-processor (380) selects one of multiple hypothetical viewing environments that most closely matches the actual viewing environment, and then applies adjustments (if any) associated with the selected hypothetical viewing environment to adjust sample values to reach a final lighting state (characterized by a nominal level of ambient light and/or a nominal color characteristic), starting from the initial lighting state of the selected hypothetical viewing environment. The post-processor (380) can also include a tool that adjusts sample values of the output video (381) depending on the characteristics of a reference display device, depending on information indicating the characteristics of the reference display device.

The post-processor (380) and output destination (390) can be in the same device as other components of the example receiver system. Or, the post-processor (380) and output destination (390) can be in different devices. For example, the post-processor (380) and output destination (390) are part of a display device, and the remaining components of the example receiver system are part of a media player or set-top box.

A buffer (not shown) is configured to stored output of the post-processor (380). An output sequencer identifies when the next picture to be produced in output order is available in a decoded picture storage area for the output video (381). When the next picture to be produced in output order is available in the decoded picture storage area, it is read by the output sequencer and output to the output destination (390) (e.g., display). In general, the order in which pictures are output from the decoded picture storage area by the output sequencer may differ from the order in which the pictures are decoded by the decoder (360).

Alternatively, the condition detector (382) provides the information (383) indicating actual lighting condition(s) of the actual viewing environment to a controller (not shown). The controller is configured to adjust, in order to compensate for differences between the actual lighting condition(s) and the nominal lighting condition(s), a characteristic of an actual display device in the actual viewing environment and/or at least one of the one or more actual lighting conditions. For example, the controller outputs a signal to adjust a level of brightness or color characteristic setting (e.g., for color temperature, or for chromaticity value or coordinates) of the actual display device. Or, the controller outputs a signal to adjust a level of ambient light in the actual viewing environment. In this case, the post-processor (380) need not adjust sample values before output to the output destination (390), in order to compensate for differences between the actual lighting condition(s) and the nominal lighting condition(s).

Depending on implementation, modules of the example receiver system can be added, omitted, split into multiple modules, combined with other modules, and/or replaced with like modules. In alternative embodiments, receiver systems with different modules and/or other configurations of modules perform one or more of the described techniques. The relationships shown between modules within the example receiver system indicate general flows of information; other relationships are not shown for the sake of simplicity.

For example, the example receiver system can be a media player or set-top box that includes the receiver-side components shown in FIG. 3. Or, the example receiver system can be a display device or other post-processing system that lacks a video decoder, buffer (for encoded data), and channel decoder, but still includes a metadata parser, condition detector, and post-processor (or controller) to compensate for differences between actual lighting condition(s) and nominal lighting condition(s). Or, the example receiver system is some other type of receiver system.

IV. Metadata Describing Nominal Lighting Conditions of Reference Viewing Environment.

This section describes examples of generating, parsing, and using metadata that describes one or more nominal lighting conditions of a reference viewing environment. Innovations described herein include, but are not limited to, the following:

Defining metadata that represents light-related characteristics of a reference viewing environment associated with one or more nominal lighting conditions for viewing image content. The metadata can include, for example, information indicating:

An ambient light level.

A representation of color characteristics of the ambient light (e.g., in terms of color temperature value or in terms of normalized (x, y) coordinates or non-normalized (X, Y, Z) coordinates in a color space such as the CIE 1931 color space).

Multiple sets of such data for different hypothetical viewing environments (e.g., together with other parameters identifying how to adapt image content for display in each hypothetical viewing environment), which can be selected depending on the actual viewing environment.

Approaches to sending such metadata from a sender to a receiver (e.g., through a communication channel or storage medium).

Approaches to receiving and using such metadata to adapt the received image content to actual viewing conditions (e.g., using measured ambient light levels or locally selected viewing environment settings together with such metadata to adapt the image content).

Approaches to embedding such metadata within a coded image or video bitstream (e.g., as an SEI message or VUI message).

Approaches that combine such metadata with metadata describing characteristics of a display device.

A. Introduction.

When image content such as video is sent through a communication system, the image content is typically digitized into sample values, which are compressed before transmission and decompressed after receipt. Various factors affect how the sample values are interpreted, displayed, and perceived.

1. Interpretation of Sample Values According to Conventions or Other Implicit Understanding.

A convention defined in a standard, proprietary format or industry practice, or other implicit understanding, may indicate how sample values should be interpreted or displayed when they are received. In some scenarios, for example, standards or industry practices have addressed how sample values should be interpreted or displayed. For standard-definition television services, for example, Rec. ITU-R BT.601 indicates how sample values should be interpreted or displayed. For high-definition television, Rec. ITU-R BT.709 and Rec. ITU-R BT.1886 indicate how sample values should be interpreted or displayed. And, for ultra-high definition television, Rec. ITU-R BT.2020 indicates how sample values should be interpreted or displayed.

2. Interpretation of Sample Values According to Explicitly Signaled Parameters.

Alternatively, information may be explicitly signaled that indicates how sample values should be interpreted or displayed. Encoded data for an image or video can include information that identifies (by enumeration or other means) how sample values should be interpreted or displayed. For example, the information can be parameters such as color primary chromaticity values, transfer characteristics (informally known as gamma), and matrix coefficients. Such parameters may be found, e.g., in encoded data for the MPEG-2 standard, H.264/AVC standard, and H.265/HEVC standard. In some cases, parameters such as color primary chromaticity values, transfer characteristics, and matrix coefficients are signaled as part of media metadata in SEI message or VUI messages defined in a standard.

Mastering display color volume ("MCDV") metadata, which was recently developed by SMPTE (see SMPTE ST 2086) and adopted into the H.265/HEVC standard as an SEI message, provide another example of explicit signaling. MDCV metadata identifies the characteristics of a reference display device used when mastering the appearance of sample values, including x and y coordinates of display primaries, the white point, and the nominal minimum and maximum display luminance. That is, sample values are edited for optimal display on a display device having the characteristics of the reference display device. Another recent example is the perceptual quantization transfer function in SMPTE ST 2084. Also, in some cases, a nominal brightness level for image display may be communicated through the system. Still other approaches, such as "tone mapping" or "knee function" warping, may be used to adapt image content depending on intended display characteristics.

3. Environmental Factors.

The metadata described in the previous section relates to the characteristics of source (original) sample values or characteristics of a display device. Display of image content, however, depends on more than the characteristics of source content and a reference, or "master," display device. The environment in which image content is viewed by a viewer, in particular the ambient light characteristics of the environment, can have a substantial effect on perceptual quality. Aside from the overall level of ambient light, the color temperature of light can differ depending on the viewing environment. Viewing image content in a darkened theater is substantially different than viewing it in a home or brightly-lit public space, which is substantially different than viewing it outdoors. Even in a home environment, the viewing experience may be substantially different in daytime when daylight is coming through windows, versus nighttime. Further, the amount (and characteristics) of light in a room can differ substantially depending on which lights in the room are turned on or off.

Some industry conventions address lighting conditions for different viewing environments used for purposes of comparison or evaluation of display devices or image content, or to specify an "optimal" viewing environment. For example, Rec. ITU-R BT.500 identifies nominal lighting conditions for viewing of pictures in a studio and in a home. For studio viewing, a dark room is assumed with a certain light level behind the viewing screen. For a home environment, the room is assumed to have a somewhat-higher level of light in the room. Specifically, Rec. ITU-R BT.500-13 (January 2012), entitled "Methodology for the Subjective Assessment of the Quality of Television Pictures," indicates that viewing environments for laboratory use and home use can differ. It describes a laboratory environment for testing (subclause 2.1.1) with a low room illumination, with $D_{65}$ ambient light chromaticity, and with a peak white display luminance of 70 cd/m$^2$ (set by picture line-up generation equipment with reference to Rec. ITU-R BT.814-2 (September 2007), entitled "Specifications and Alignment Procedures for Setting of Brightness and Contrast of Displays"), and a background behind the picture with a brightness 0.15 times the peak white display luminance (i.e., about 10.5 cd/m$^2$). The recommendation describes a home viewing environment (subclause 2.1.2) with 200 lux ambient light level and a display peak white luminance of 200 cd/m$^2$.

As another example, Rec. ITU-R BT.2035 (July 2013), entitled "A Reference Viewing Environment for Evaluation of HDTV Program Material or Completed Programmes," describes (cf. subclause 1.1) a viewing environment with 10 lux of ambient light luminance and having a background chromaticity of $D_{65}$ (x=0.3127, y=0.3290) or $D_{93}$ (x=0.2831, y=0.2971), for use with a display having peak white (value 940 in 10-bit representation) luminance of 100 cd/m² (100 nits).

As another example, Rec. ITU-R BT.2022 (August 2012), entitled "General Viewing Conditions for Subjective, Assessment of Quality of SDTV and HDTV, Television Pictures on Flat Panel Displays," describes a viewing environment similar to the one found in Rec. ITU-R BT.500-13 (January 2012), except in regard to peak white brightness. For laboratory environments, the recommendation describes a peak white range of 70-250 cd/m². For home environments, the recommendation describes a peak white range of 70-500 cd/m².

As another example, Rec. ITU-R BT.710-4 (November 1998), entitled "Subjective Assessment Methods for Image Quality in High-definition Television," recommends that subjective assessments be conducted in a low-light environment similar to that described in BT.500 and BT.2022. The recommendation describes a peak white range of 150-250 cd/m², and is otherwise similar to BT.500 and BT.2022.

As another example, Rec. ITU-R BT.1129 (February 1998), entitled "Subjective Assessment of Standard Definition Digital Television (SDTV) Systems," describes conditions for both a laboratory environment and home environment. These conditions are similar to those found in BT.500, except the recommendation does not identify a colour for the ambient light.

Technical Report ITU-R BT.2390 addresses high-dynamic-range video and its relationship to a reference viewing environment.

These recommendations illustrate that viewing environments differ in practice, even for semi-ideal viewing conditions. Moreover, viewing conditions that are experienced in practice can differ substantially from those identified in these recommendations. Thus, in actual viewing environments, actual lighting conditions may differ substantially from the nominal lighting conditions established by a standard or industry convention. Even when some specification of a reference viewing environment exists for an application, the actual viewing environment used when mastering image content may differ from the specified reference viewing environment. Also, even when a reference viewing environment is used when mastering image content, the actual viewing environment in which image content is later viewed may differ substantially from the viewing environment used when mastering the picture representation.

4. Metadata Describing Nominal Lighting Conditions of Reference Viewing Environment.

In various examples described herein, an SEI message or other metadata includes parameters that describe the nominal lighting conditions (e.g., level of ambient light, color characteristics of ambient light) of a reference viewing environment. The metadata can describe a reference viewing environment in place (e.g., implicitly assumed, explicitly chosen, designed-in, or intended) when mastering image content. By conveying a representation of the nominal lighting conditions of a reference viewing environment that was in place when mastering image content, a transmitter system can enable a receiver system to adapt its local display of the image content. Upon receiving image content and the metadata, the receiver system can identify characteristics of the actual viewing environment (e.g., by measuring the level of ambient light in the actual viewing environment, and/or by applying a preset setting selected by the user or set according to the type of actual viewing environment). The receiver system can use the metadata to determine whether the actual viewing environment matches the reference viewing environment. If not, the receiver system can adjust sample values (e.g., adjusting intensity and/or color characteristics) to compensate for differences, if any, between the nominal lighting conditions and actual lighting conditions. Thus, the receiver system can adapt the image content rendered by the actual display device to enable a viewing experience that is adapted appropriately for the actual viewing environment.

In example implementations, the SEI message or other metadata can convey information about nominal lighting conditions for reference viewing environments described in ITU-R BT.2035 and many other recommendations listed above. Various other nominal lighting conditions can also be specified using the metadata. This allows a receiver system to adjust sample values so that perceived quality is closer to what it would be in the reference viewing environment.

At the receiver system, the actual lighting conditions can be determined, for example, using a light sensor or user-defined setting. Adaptive display brightness and light sensor technology are becoming common in devices such as mobile phones, tablets, and laptop computers. In some example implementations, such technology can used to detect actual lighting conditions and adjust sample values to compensate for differences between the actual lighting conditions and nominal lighting conditions of a reference viewing environment.

In contrast to the approaches described below, the MDCV SEI message includes parameters describing characteristics of a master display device. The MDCV SEI message does not provide a way to specify ambient light levels or characteristics of a reference viewing environment in place when mastering image content. Conveying data that represents such viewing environment characteristics enables a receiver system to adapt its local display (e.g., based on a user pre-setting or light sensor input) for optimal display.

B. Examples of Transmitter-Side Activity.

Figure 4:
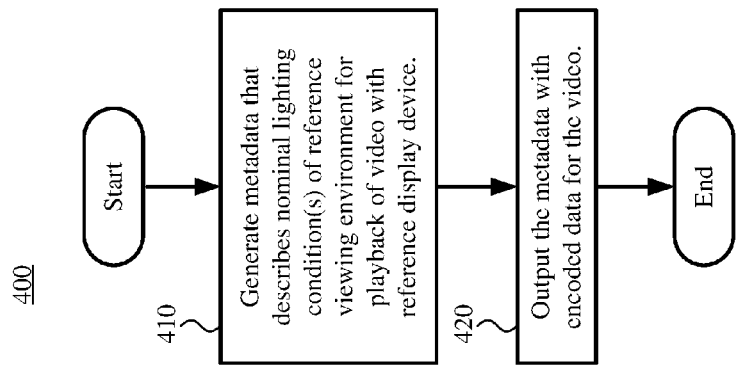
FIG. 4 is a flowchart illustrating a generalized technique for generating metadata that describes nominal lighting conditions of a reference viewing environment for video playback.

FIG. 4 shows a generalized technique (400) for generating metadata that describes one or more nominal lighting conditions of a reference viewing environment for video playback. A transmitter system such as one described with reference to FIG. 3, or other transmitter system, performs the technique (400).

The transmitter system generates (410) metadata that describes one or more nominal lighting conditions of a reference viewing environment for playback of video. For example, the metadata includes one or more parameters that specify a nominal level of ambient light in the reference viewing environment (e.g., an indicator of light per unit of area). Or, as another example, the metadata includes one or more parameters that specify a nominal color characteristic of ambient light in the reference viewing environment (e.g., coordinates in a multi-dimensional mapping of values in a color space, or a value in a color temperature scale). Or, as another example, the metadata includes one or more parameters that specify (a) a nominal level of light reflected by a reference display device in the reference viewing environment, and/or (b) one or more color characteristics of the light reflected by the reference display device in the reference viewing environment. Or, as another example, the metadata includes one or more parameters that specify, for the nominal lighting condition(s) of the reference viewing environment, adjustments (if any) to reach a final lighting state from an initial lighting state of a hypothetical viewing environment. Or, as another example, the metadata includes multiple sets of parameters, where each of the multiple sets of parameters is associated with a different hypothetical viewing environment having an initial lighting state, and where each of the multiple sets of parameters includes one or more parameters that specify, for the nominal lighting condition(s) of the reference viewing environment, adjustments (if any) to reach a final lighting state from the initial lighting state of the hypothetical viewing environment for that set of parameters. Or, as another example, the metadata includes some combination of the preceding types of parameters. Alternatively, the metadata can include other and/or additional parameters that describe nominal lighting condition(s) of a reference viewing environment for playback of video.

The transmitter system outputs (420) the metadata with encoded data for the video. For example, the outputting includes transmitting the metadata over a communications channel. Or, the outputting includes writing the metadata to a storage medium. Aside from describing the nominal lighting condition(s) of the reference viewing environment, the metadata can also describe characteristics of a reference display device.

The organization of the metadata depends on implementation. For example, the metadata is organized as part of an SEI message or VUI message, where the SEI message or VUI message is part of a video elementary bitstream for the video. Or, as another example, the metadata is organized as part of a field of a container format. Or, as another example, the metadata is organized as part of a message according to a transport protocol. Alternatively, the metadata is organized in some other way.

Figure 5:
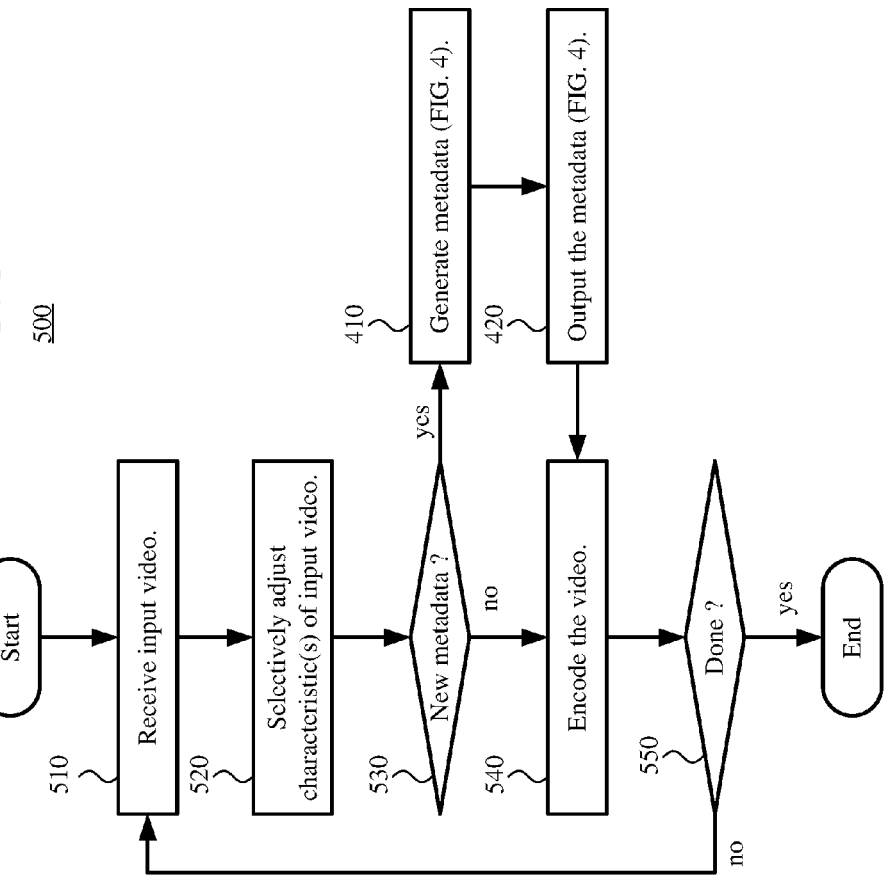
FIG. 5 is a flowchart illustrating an example technique for generating metadata that describes nominal lighting conditions of a reference viewing environment for video playback.

FIG. 5 shows an example technique (500) for generating metadata that describes one or more nominal lighting conditions of a reference viewing environment for video playback. A transmitter system such as one described with reference to FIG. 3, or other transmitter system, performs the technique (500). Options described above with reference to the generalized technique (400) of FIG. 4 also apply for the example technique (500) of FIG. 5.

The transmitter system receives (510) input video (e.g., for a current picture of a video sequence). The transmitter system selectively adjusts (520) at least some characteristics of the input video. For example, based on (a) characteristics of a reference display device, and/or (b) nominal lighting condition(s) of a reference viewing environment, the transmitter system adjusts at least some sample values of the input video. Examples of adjustment of sample values are described with reference to the pre-processor (320) of FIG. 3. Alternatively, the transmitter system selectively adjusts sample values in some other way. At least some sample values may be unchanged by the selective adjustment (520).

The transmitter system checks (530) whether there is new metadata that describes the nominal lighting condition(s) of the reference viewing environment. If so, the transmitter system generates (410) and outputs (420) metadata as described with reference to FIG. 4. The transmitter system can be configured to check for such new metadata upon the occurrence of some event (e.g., a new coded video sequence or coded layer-wise video sequence), but otherwise keep the same metadata that describes nominal lighting condition(s) of the reference viewing environment.

The transmitter system encodes (540) the selectively adjusted input video to produce the encoded data for the video. The transmitter system checks (550) whether to continue and, if so, receives more input video (e.g., for the next picture of a video sequence).

C. Examples of Receiver-Side Activity.

Figure 6:
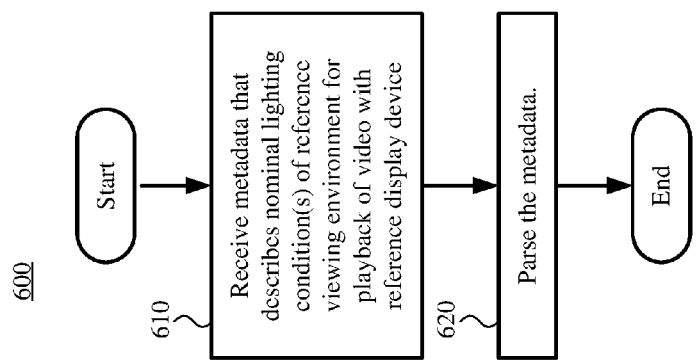
FIG. 6 is a flowchart illustrating a generalized technique for parsing metadata that describes nominal lighting conditions of a reference viewing environment for video playback.

FIG. 6 shows a generalized technique (600) for parsing metadata that describes one or more nominal lighting conditions of a reference viewing environment for video playback. A receiver system such as one described with reference to FIG. 3, or other receiver system, performs the technique (600).

The receiver system receives (610) and parses (620) metadata that describes one or more nominal lighting conditions of a reference viewing environment for playback of video. For example, the metadata includes one or more parameters that specify a nominal level of ambient light in the reference viewing environment (e.g., an indicator of light per unit of area). Or, as another example, the metadata includes one or more parameters that specify a nominal color characteristic of ambient light in the reference viewing environment (e.g., coordinates in a multi-dimensional mapping of values in a color space, or a value in a color temperature scale). Or, as another example, the metadata includes one or more parameters that specify (a) a nominal level of light reflected by a reference display device in the reference viewing environment, and/or (b) one or more color characteristics of the light reflected by the reference display device in the reference viewing environment. Or, as another example, the metadata includes one or more parameters that specify, for the nominal lighting condition(s) of the reference viewing environment, adjustments (if any) to reach a final lighting state from an initial lighting state of a hypothetical viewing environment. Or, as another example, the metadata includes multiple sets of parameters, where each of the multiple sets of parameters is associated with a different hypothetical viewing environment having an initial lighting state, and where each of the multiple sets of parameters includes one or more parameters that specify, for the nominal lighting condition(s) of the reference viewing environment, adjustments (if any) to reach a final lighting state from the initial lighting state of the hypothetical viewing environment for that set of parameters. Or, as another example, the metadata includes some combination of the preceding types of parameters. Alternatively, the metadata can include other and/or additional parameters that describe nominal lighting condition(s) of a reference viewing environment for playback of video.

Aside from describing the nominal lighting condition(s) of the reference viewing environment, the metadata can also describe characteristics of a reference display device.

The organization of the metadata depends on implementation. For example, the metadata is organized as part of an SEI message or VUI message, where the SEI message or VUI message is part of a video elementary bitstream for the video. Or, as another example, the metadata is organized as part of a field of a container format. Or, as another example, the metadata is organized as part of a message according to a transport protocol. Alternatively, the metadata is organized in some other way.

Figure 7:
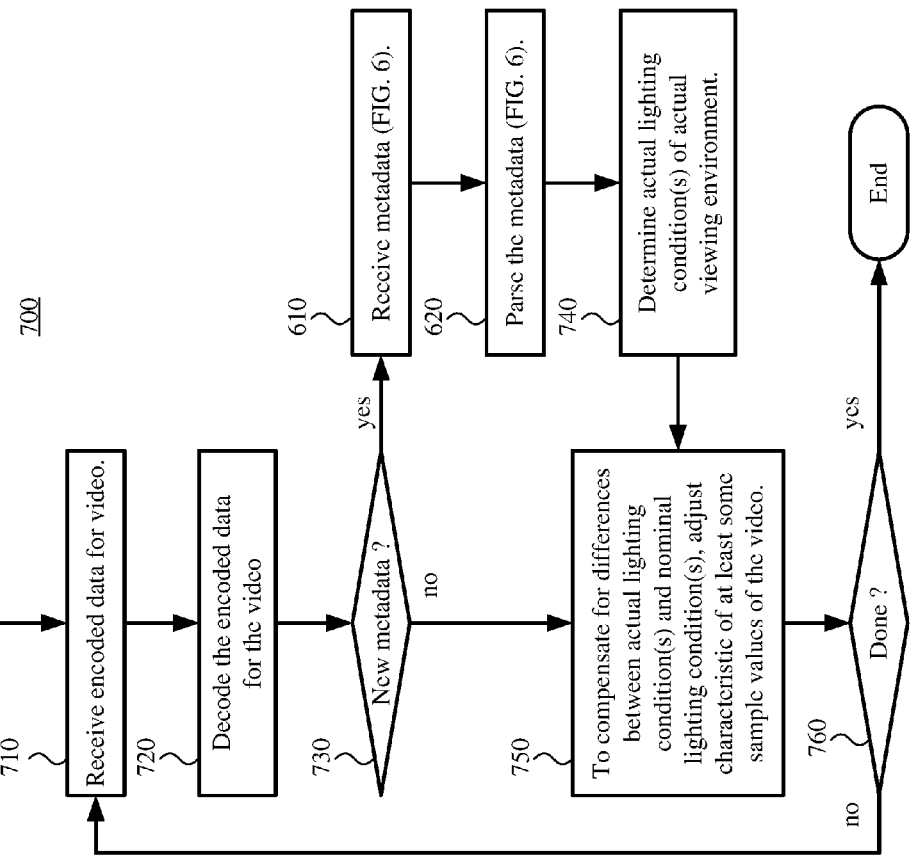
FIG. 7 is a flowchart illustrating an example technique for parsing and using metadata that describes nominal lighting conditions of a reference viewing environment for video playback.

FIG. 7 shows an example technique (700) for parsing and using metadata that describes one or more nominal lighting conditions of a reference viewing environment for video playback. A receiver system such as one described with reference to FIG. 3, or other receiver system, performs the technique (700). Options described above with reference to the generalized technique (600) of FIG. 6 also apply for the example technique (700) of FIG. 7.

The receiver system receives (710) and decodes (720) encoded data for video (e.g., for a current picture of a video sequence). The receiver system checks (730) whether there is new metadata that describes the nominal lighting condition(s) of a reference viewing environment for video playback. If so, the receiver system receives (610) and parses (620) metadata as described with reference to FIG. 6. The receiver system can be configured to check for such new metadata upon the occurrence of some event (e.g., a new coded video sequence or coded layer-wise video sequence), but otherwise keep the same metadata that describes nominal lighting condition(s) of the reference viewing environment.

The receiver system also determines (740) one or more actual lighting conditions of an actual viewing environment. The receiver system can measure at least one of the actual lighting condition(s) (e.g., using a sensor to measure an actual level of ambient light). The receiver system can also look up one or more values in a storage area that indicate at least one actual lighting condition (e.g., after the receiver system has received user input that specifies the value(s) for the actual lighting condition(s) and stored the specified value(s) in the storage area). Alternatively, the receiver system determines the actual lighting condition(s) of the actual viewing environment in some other way.

In some approaches, the receiver system determines (740) the actual lighting condition(s) only when new metadata is received (as shown in FIG. 7). Alternatively, the receiver system can determine the actual lighting condition(s) more frequently (e.g., before decoding of any picture, or periodically during decoding), regardless of whether new metadata has been received that describes nominal lighting condition(s) of the reference viewing environment.

The receiver system selectively adjusts (750) at least some characteristics of at least some sample values of the decoded video. In doing so, the receiver system can in effect change the interpretation of the sample values of the decoded video. Examples of adjustment of sample values are described with reference to the post-processor (380) of FIG. 3. Alternatively, the receiver system selectively adjusts sample values in some other way. At least some sample values may be unchanged by the selective adjustment. In particular, if the actual lighting condition(s) of the actual viewing environment match or closely approximate the nominal lighting condition(s) of the reference viewing environment, the receiver system can skip the selective adjustment (750) of sample values.

For example, suppose the nominal lighting condition(s) include a nominal level of ambient light in the reference viewing environment, and the actual lighting condition(s) include an actual level of ambient light in the actual viewing environment. If the nominal level of ambient light is brighter than the actual level of ambient light, the receiver system decreases the brightness of at least some sample values of the video. If the nominal level of ambient light is darker than the actual level of ambient light, the receiver system increases the brightness of at least some sample values of the video. On the other hand, if the nominal level of ambient light is the same as the actual level of ambient light (or close enough, according to a threshold of similarity), the receiver system does not change the brightness of sample values of the video Or, as another example, suppose the nominal lighting condition(s) include a nominal color characteristic of ambient light in the reference viewing environment, and the actual lighting condition(s) include an actual color characteristic of ambient light in the actual viewing environment. The receiver system scales or attenuates at least some sample values of the video to compensate for differences between the actual color characteristic and the nominal color characteristic. Thus, if certain colors would be "washed out" due to differences between the actual color characteristic and the nominal color characteristic, the receiver system can selectively apply a gain factor to sample values in order to increase the visibility of those colors. Or, if certain colors would be too prominent due to differences between the actual color characteristic and the nominal color characteristic, the receiver system can selectively attenuate sample values in order to decrease the visibility of those colors.

Or, as another example, suppose the metadata includes multiple sets of parameters. Each of the sets of parameters is associated with a different hypothetical viewing environment having an initial lighting state. Also, each of the sets of parameters includes one or more parameters that specify, for the nominal lighting condition(s) of the reference viewing environment, adjustments (if any) to reach a final lighting state from the initial lighting state of the hypothetical viewing environment for that set of parameters. (For at least one of the sets of parameters, when the hypothetical viewing environment is sufficiently close to the reference viewing environment, the adjustments can be "null" adjustments, such that no sample values are adjusted.) Based at least in part on the actual lighting condition(s) of the actual viewing environment, the receiver system selects one of the multiple sets of parameters whose different hypothetical viewing environment is closest to the actual viewing environment. Then, to adjust sample values of the video, the receiver system performs adjustments (if any) for the selected set of parameters to reach the final lighting state.

More generally, to compensate for differences between the actual lighting condition(s) and the nominal lighting condition(s), the receiver system can adjust one or more of: (a) a characteristic of at least some sample values of the video; (b) a characteristic of an actual display device in the actual viewing environment; and (c) at least one of the one or more actual lighting conditions of the actual viewing environment. For example, a controller of the receiver system outputs a signal to adjust a level of brightness or color characteristic setting (e.g., for color temperature, or for chromaticity value or coordinates) of the actual display device. Or, a controller of the receiver system outputs a signal to adjust a level of ambient light in the actual viewing environment.

The receiver system checks (750) whether to continue and, if so, receives more encoded data for the video (e.g., for the next picture of a video sequence).

D. Example Implementations.

This section describes example implementations of signaling and parsing metadata that describes one or more nominal lighting conditions of a reference viewing environment for video playback. In the example implementations, the metadata is signaled in one or more SEI messages within an elementary video bitstream. The metadata can describe nominal lighting condition(s) in place (e.g., implicitly assumed, explicitly chosen, designed-in, or intended) for a reference viewing environment when mastering image content such as video.

FIG. 8 shows an example syntax structure (800) for an ambient viewing environment ("AVE") SEI message that includes metadata defining nominal lighting conditions of a reference viewing environment for video playback. In general, the syntax structure (800) for the AVE SEI message includes parameters that identify characteristics of ambient light in the reference viewing environment when associated video content is rendered. The syntax elements of the AVE SEI message may help a receiver system adapt video content for display in an actual viewing environment that may be similar to, or may substantially differ from, the reference viewing environment in place when mastering the video content.

In FIG. 8, the syntax element ambient_illuminance specifies the environmental illluminance of the reference viewing environment in units of 0.0001 lux. The value of the syntax element ambient_illuminance is greater than 0. More generally, the syntax element ambient_illuminance indicates a nominal level of ambient light in the reference viewing environment. Alternatively, to indicate a nominal level of ambient light in the reference viewing environment, the AVE SEI message can include a measure of "nits" (candelas per squared meter) or other type of measure.

The syntax elements ambient_light_x and ambient_light_y specify normalized x and y chromaticity coordinates, respectively, of ambient light in the reference viewing environment. The normalized x and y chromaticity coordinates can be expressed in increments of 0.00002, according to the CIE 1931 definition of x and y as specified in ISO 11664-1. See also ISO 11664-3 and CIE 15. The values of the syntax elements ambient_light_x and ambient_light_y are in the range of 0 to 50,000. Alternatively, syntax elements in the syntax structure (800) can specify non-normalized coordinates X, Y, and Z in a color space such as CIE 1931. (Non-normalized notation for CIE 1931 color is generally expressed using capital letters, which distinguishes it from the lowercase letters used for normalized representation—which may be related as $x=X/(X+Y+Z)$, $y=Y/(X+Y+Z)$, and $z=Z/(X+Y+Z)$, such that $x+y+z=1$, and therefore the value of z is generally omitted since it is equal by definition to $z=1-x-y$. Normalized representation represents the chromaticity (color) of the light in a manner separated from its intensity, whereas non-normalized representation includes a description of both the intensity and color of the light.)

Using the syntax elements shown in FIG. 8 for the AVE SEI message, various commonly accepted lighting conditions can be specified as the nominal lighting conditions for a reference viewing environment for video playback. For example, Rec. ITU-R BT.2035 specifies a reference viewing environment for evaluation of HDTV program material, where the reference viewing environment has 10 lux of ambient light luminance with a background chromaticity of $D_{65}$ (x=0.3127, y=0.3290) or $D_{93}$ (x=0.2831, y=0.2971), for use with a display device having peak white luminance of 100 cd/m² (100 nits). Such nominal lighting conditions can be expressed using a value of 100,000 for ambient_illuminance (100,000×0.0001=10 lux), with background chromaticity with values of 15,635 for ambient_light_x (x=15,635× 0.00002=0.3127) and 16,450 for ambient_light_y (y=16,450×0.00002=0.329) for $D_{65}$. Alternatively, for $D_{93}$, the background chromaticity is specified with values with values of 14,155 for ambient_light_x (x=14,155× 0.00002=0.2831) and 14,855 for ambient_light_y (y=14,855×0.00002=0.2971).

Alternatively, the syntax structure (800) for the AVE SEI message can include other and/or additional syntax elements. For example, a syntax element in the AVE SEI message can indicate the color temperature of ambient light in the reference viewing environment (e.g., 2700 Kelvin for "warm" relatively-yellow light, or a higher color temperature such as 4000 K or 6000 K for a bluer, more "cool" white light). Or, a syntax element of the syntax structure (800) indicates some other color characteristic for ambient light in the reference viewing environment.

The syntax structure (800) for the AVE SEI message can follow the general syntax and semantics for SEI messages in the H.265/HEVC standard or H.264/AVC standard. For example, for the H.265/HEVC standard, the AVE SEI message is integrated into section D.2.1 (general SEI message syntax) and Table D.1 (persistence scope of SEI messages). The persistence scope for the AVE SEI message is the coded layer-wise video sequence ("CLVS"). When the AVE SEI message is present for any picture of a CLVS of a particular layer, and the first picture of the CLVS is an intra random access point ("IRAP") picture, the AVE SEI message is present for that IRAP picture. The AVE SEI message persists for the current layer in decoding order, from the current picture until the end of the CLVS. All instances of the AVE SEI message that apply to the same CLVS have the same content. Alternatively, the scope for the AVE SEI message is the coded video sequence or some other portion of the video.

The AVE SEI message shown in FIG. 8 provides information about the characteristics of ambient light in a reference viewing environment. Unlike some other types of SEI message, the AVE SEI message shown in FIG. 8 does not provide information on color transformations that would be appropriate to preserve creative intent on display devices with color volumes different from that of a mastering display device.

E. Alternatives.

In the examples described above, metadata describes one or more nominal lighting conditions for a reference viewing environment taken as a whole. Alternatively, the reference viewing environment includes multiple regions, and the metadata includes, for each of the multiple regions, one or more parameters that specify those of the nominal lighting condition(s) that apply for the region. For example, the multiple regions include a first region behind an expected position of a viewer in the reference viewing environment, and a second region in front of the expected position of the viewer in the reference viewing environment. Or, the multiple regions include a first region behind an expected position of a viewer in the reference viewing environment, and a second region in front of the expected position of the viewer in the reference viewing environment and behind a reference display device. With such metadata, a receiver system can differentiate between light in different regions of the viewing environment, and adjust sample values in different ways depending on position of the viewer (e.g., focusing on characteristics of ambient light that is in front of the expected position of the viewer and behind the reference display device in the reference viewing environment).

In many of the examples described above, metadata that describes nominal lighting condition(s) for a reference viewing environment includes a single set of parameters. Alternatively, multiple sets of parameters can be generated, signaled, parsed, and selectively used, where each set of parameters indicates how to adapt image content for display in a manner customized to a different hypothetical viewing environment. Upon receiving image content and metadata, a receiver system can identify characteristics of the actual viewing environment (e.g., by measuring the light in the actual viewing environment or by applying a preset setting selected by the user or set according to the type of viewing environment). The receiver system can choose which of the different hypothetical viewing environments best matches the actual viewing environment. Using adjustments defined for the chosen hypothetical viewing environment, the receiver system can then adjust sample values of video (e.g., adjusting intensity and/or color characteristics) rendered by the actual display device to enable a viewing experience that is adapted appropriately for the actual viewing environment.

In many of the examples described above, metadata describing nominal lighting condition(s) of a reference viewing environment is signaled as part of an SEI message. Alternatively, such metadata is signaled in some other way, e.g., as part of a VUI message or through some other mechanism in a communication system.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A computing system comprising:
a buffer configured to receive video;
a pre-processor configured to master content of the video by selectively adjusting at least some sample values of the video based on one or more of (a) characteristics of a reference display device, and (b) one or more nominal lighting conditions of a reference viewing environment in place when mastering the content of the video;
a metadata generator configured to generate metadata that describes the one or more nominal lighting conditions of the reference viewing environment in place when mastering the content of the video, wherein the metadata includes:
one or more parameters that specify a nominal level of ambient light in the reference viewing environment, the one or more parameters that specify the nominal level of ambient light including an indicator of light per unit of area in units of lux; and
one or more parameters that specify a nominal color characteristic of the ambient light in the reference viewing environment, the one or more parameters that specify the nominal color characteristic of ambient light including normalized x and y chromaticity coordinates in a multi-dimensional mapping of values in a color space; and
a buffer configured to store the metadata for output with encoded data for the video, wherein the metadata is organized for output as part of a video elementary bitstream for the video, the video elementary bitstream also including the encoded data for the video.

2. The computing system of claim 1, further comprising:
a video encoder configured to encode the video to produce the encoded data for the video.

3. The computing system of claim 1, wherein the indicator specifies the nominal level of ambient light in units of 0.0001 lux, and wherein the normalized x and y chromaticity coordinates are expressed in increments of 0.00002.

4. The computing system of claim 1, wherein the one or more parameters that specify the nominal color characteristic of the ambient light further include a value in a color temperature scale.

5. The computing system of claim 1, wherein the metadata further includes one or more parameters that specify one or more of:
a nominal level of light reflected by the reference display device in the reference viewing environment; and
one or more color characteristics of the light reflected by the reference display device in the reference viewing environment.

6. The computing system of claim 1, wherein the metadata further includes one or more parameters that specify, for the one or more nominal lighting conditions of the reference viewing environment, adjustments, if any, to reach a final lighting state from an initial lighting state of a hypothetical viewing environment.

7. The computing system of claim 1, wherein the metadata further includes multiple sets of parameters, and wherein each of the multiple sets of parameters:
is associated with a different hypothetical viewing environment having an initial lighting state; and
includes one or more parameters that specify, for the one or more nominal lighting conditions of the reference viewing environment, adjustments, if any, to reach a final lighting state from the initial lighting state of the hypothetical viewing environment for that set of parameters.

8. The computing system of claim 1, wherein the reference viewing environment includes multiple regions, and wherein the metadata includes, for each of the multiple regions, one or more parameters that specify those of the one or more nominal lighting conditions that apply for the region, the multiple regions including a first region and a second region, the first region being behind an expected position of a viewer in the reference viewing environment, the second region being in front of the expected position of the viewer in the reference viewing environment.

9. The computing system of claim 1, wherein the metadata is organized as part of:
a supplemental enhancement information ("SEI") message in the video elementary bitstream for the video; or
a video usability information ("VUI") message in the video elementary bitstream for the video.

10. The computing system of claim 1, wherein the metadata is organized as part of a supplemental enhancement information ("SEI") message that is part of the video elementary bitstream for the video, and wherein persistence scope for the SEI message is coded layer-wise video sequence ("CLVS"), such that the SEI message persists, for a current layer in decoding order, from a current picture until end of the CLVS.

11. In a computing system, a method comprising:
receiving metadata that describes one or more nominal lighting conditions of a reference viewing environment in place when mastering content of video, wherein the metadata is received as part of a video elementary bitstream for the video, the video elementary bitstream also including encoded data for the video, and wherein the metadata includes:
one or more parameters that specify a nominal level of ambient light in the reference viewing environment, the one or more parameters that specify the nominal level of ambient light including an indicator of light per unit of area in units of lux; and
one or more parameters that specify a nominal color characteristic of the ambient light in the reference viewing environment, the one or more parameters that specify the nominal color characteristic of ambient light including normalized x and y chromaticity coordinates in a multi-dimensional mapping of values in a color space; and
parsing the metadata.

12. The method of claim 11, further comprising:
determining one or more actual lighting conditions of an actual viewing environment; and
to compensate for differences between the one or more actual lighting conditions and the one or more nominal lighting conditions, adjusting a characteristic of at least some sample values of the video.

13. The method of claim 12, wherein the one or more actual lighting conditions include an actual level of ambient light in the actual viewing environment, and wherein the adjusting comprises:
if the nominal level of ambient light is brighter than the actual level of ambient light, decreasing brightness of the at least some sample values of the video; and
if the nominal level of ambient light is darker than the actual level of ambient light, increasing brightness of the at least some sample values of the video.

14. The method of claim 12, wherein the one or more actual lighting conditions include an actual color characteristic of ambient light in the actual viewing environment, and wherein the adjusting comprises scaling or attenuating the at least some sample values of the video to compensate for differences between the actual color characteristic and the nominal color characteristic.

15. The method of claim 12, wherein the determining the one or more actual lighting conditions includes measuring at least one of the one or more actual lighting conditions.

16. The method of claim 12, further comprising:
receiving user input that specifies a value for at least one of the one or more actual lighting conditions; and
storing the specified value in a storage area;
wherein the determining the one or more actual lighting conditions includes looking up the specified value in the storage area.

17. The method of claim 11, further comprising:
determining one or more actual lighting conditions of an actual viewing environment; and
to compensate for differences between the one or more actual lighting conditions and the one or more nominal lighting conditions, adjusting at least one of the one or more actual lighting conditions of the actual viewing environment;
wherein the metadata includes multiple sets of parameters, and wherein each of the multiple sets of parameters:
is associated with a different hypothetical viewing environment having an initial lighting state; and
includes one or more parameters that specify, for the one or more nominal lighting conditions of the reference viewing environment, adjustments, if any, to reach a final lighting state from the initial lighting state of the hypothetical viewing environment for that set of parameters.

18. The method of claim 17, further comprising:
based at least in part on the one or more actual lighting conditions of the actual viewing environment, selecting one of the multiple sets of parameters whose different hypothetical viewing environment is closest to the actual viewing environment; and
for the adjusting, performing adjustments, if any, for the selected set of parameters to reach the final lighting state.

19. The method of claim 11, further comprising:
receiving, as part of the video elementary bitstream, the encoded data for the video; and
decoding the encoded data for the video.

20. The method of claim 11, wherein the metadata is organized as part of a supplemental enhancement information ("SEI") message that is part of the video elementary bitstream for the video, and wherein persistence scope for the SEI message is coded layer-wise video sequence ("CLVS"), such that the SEI message persists, for a current layer in decoding order, from a current picture until end of the CLVS.

21. The method of claim 11, wherein the indicator specifies the nominal level of ambient light in units of 0.0001 lux, and wherein the normalized x and y chromaticity coordinates are expressed in increments of 0.00002.

22. A computing system comprising:
a buffer configured to store metadata that describes one or more nominal lighting conditions of a reference viewing environment in place when mastering content of video, wherein the metadata is part of a video elementary bitstream for the video, the video elementary bitstream also including encoded data for the video, and wherein the metadata includes:
one or more parameters that specify a nominal level of ambient light in the reference viewing environment, the one or more parameters that specify the nominal level of ambient light including an indicator of light per unit of area in units of lux; and
one or more parameters that specify a nominal color characteristic of the ambient light in the reference viewing environment, the one or more parameters that specify the nominal color characteristic of ambient light including normalized x and y chromaticity coordinates in a multi-dimensional mapping of values in a color space;
a metadata parser configured to parse the metadata;
a buffer configured to store the encoded data for the video;
a video decoder configured to decode the encoded data for the video;
a condition detector configured to determine one or more actual lighting conditions of an actual viewing environment; and
a post-processor configured to compensate for differences between the one or more actual lighting conditions and the one or more nominal lighting conditions by adjusting a characteristic of at least some sample values of the video.

23. The computing system of claim 22, wherein the indicator specifies the nominal level of ambient light in units of 0.0001 lux, and wherein the normalized x and y chromaticity coordinates are expressed in increments of 0.00002.

24. The computing system of claim 22, wherein the metadata is organized as part of a supplemental enhancement information ("SEI") message that is part of the video elementary bitstream for the video, and wherein persistence scope for the SEI message is coded layer-wise video sequence ("CLVS"), such that the SEI message persists, for a current layer in decoding order, from a current picture until end of the CLVS.

* * * * *